United States Patent
Tamegai

(10) Patent No.: US 8,159,797 B2
(45) Date of Patent: Apr. 17, 2012

(54) OVERVOLTAGE PROTECTION CIRCUIT

(75) Inventor: Yoichi Tamegai, Kyoto (JP)

(73) Assignee: Rohm Co., Ltd. (JP)

(*) Notice: Subject to any disclaimer, the term of this patent is extended or adjusted under 35 U.S.C. 154(b) by 398 days.

(21) Appl. No.: 12/256,826

(22) Filed: Oct. 23, 2008

(65) Prior Publication Data

US 2009/0103219 A1    Apr. 23, 2009

(30) Foreign Application Priority Data

Oct. 23, 2007   (JP) ................................. 2007-274655

(51) Int. Cl.
*H02H 3/20*     (2006.01)
*H02H 9/04*     (2006.01)
*H02H 7/00*     (2006.01)
*H02H 9/00*     (2006.01)

(52) U.S. Cl. ........................................ 361/91.1; 361/18

(58) Field of Classification Search .................... 361/18, 361/91.1
See application file for complete search history.

(56) References Cited

U.S. PATENT DOCUMENTS

| 5,465,188 | A  | * | 11/1995 | Pryor et al. ...................... 361/18 |
| 6,028,755 | A  | * | 2/2000  | Saeki et al. .................. 361/91.1 |
| 7,053,592 | B2 | * | 5/2006  | Pihet et al. ..................... 323/266 |
| 7,256,605 | B2 | * | 8/2007  | Ball .......................... 324/762.09 |
| 2009/0034139 | A1 | * | 2/2009 | Martin ......................... 361/91.1 |

FOREIGN PATENT DOCUMENTS

JP    2004-70666    3/2004

* cited by examiner

*Primary Examiner* — Rexford N Barnie
*Assistant Examiner* — Christopher Clark
(74) *Attorney, Agent, or Firm* — Cantor Colburn LLP

(57) ABSTRACT

An input terminal is externally input with an input voltage. An output transistor of N-channel MOSFET is arranged between the input terminal and an output terminal. A charge pump circuit steps up the input voltage. An error amplifier receives a voltage stepped up by the charge pump circuit as a power supply, and outputs an error voltage of a feedback voltage corresponding to an output voltage of the output terminal and a predetermined reference voltage to a gate of the output transistor. A controller compares the input voltage with a predetermined threshold voltage, and forcibly turns OFF the output transistor when the input voltage is higher than the threshold voltage.

2 Claims, 2 Drawing Sheets

OVERVOLTAGE PROTECTION CIRCUIT

BACKGROUND OF THE INVENTION

1. Field of the Invention

The present invention relates to an overvoltage protection circuit which protects a circuit from an overvoltage.

2. Description of the Related Art

A circuit element used in a semiconductor integrated circuit is not able to execute a normal function when applied with a voltage exceeding a withstanding voltage. In electronic equipments that operate using an external power supply, in particular, an equipment presumed to be employing an emergency power supply using a dry battery or a USB (Universal Serial Bus) power supply of unsatisfactory quality, the overvoltage protection circuit which protects the circuit element from overvoltage is required since there is a possibility high voltage outside the rating will be applied.

[Patent document 1] Japanese Patent Application (Laid Open) No. 2004-70666

The overvoltage protection circuit is generally arranged between an input terminal and an output terminal, and includes a switch element which is turned OFF when the voltage of the input terminal (hereinafter referred to as input voltage) exceeds a threshold value. In the case of such configuration, the voltage of the output terminal (hereinafter referred to as output voltage) is suppressed to smaller than or equal to a threshold voltage. However, the output voltage also fluctuates if the voltage level of the external power supply fluctuates in a region lower than the threshold voltage.

SUMMARY OF THE INVENTION

In view of the above problems, the general purpose of the present invention is to provide an overvoltage protection circuit capable of stabilizing the output voltage.

An overvoltage protection circuit according to an embodiment of the present invention includes an input terminal externally input with an input voltage; an output terminal; an output transistor of N-channel MOSFET (Metal Oxide Semiconductor Field Effect Transistor) arranged between the input terminal and the output terminal; a charge pump circuit which steps up the input voltage; and an error amplifier which receives a voltage stepped up by the charge pump circuit as a power supply, and outputs an error voltage of a feedback voltage corresponding to a voltage of the output terminal and a predetermined reference voltage to a gate of the output transistor.

According to the embodiment, the output voltage can be stabilized to smaller than or equal to the reference voltage by the source follower type regulator configured by the output transistor and the error amplifier. Furthermore, since the voltage higher than the source voltage can be applied to the gate of the output transistor by using the charge pump circuit, the input voltage can be taken out as the output voltage as is.

The overvoltage protection circuit of the embodiment may further include a controller which compares the input voltage with a predetermined threshold voltage, and forcibly turns OFF the output transistor when the input voltage is higher than the threshold voltage.

The overvoltage protection circuit of the embodiment may be monolithically integrated on one semiconductor substrate. The phrase "monolithically integrated" includes a case where all the components of the circuit are formed on the semiconductor substrate, and a case where the main components of the circuit are monolithically integrated, where some resistors, capacitors, and the like may be arranged outside the semiconductor substrate for circuit constant adjustment.

It is to be noted that any arbitrary combination or rearrangement of the above-described structural components and so forth is effective as and encompassed by the present embodiments.

Moreover, this summary of the invention does not necessarily describe all necessary features so that the invention may also be a sub-combination of these described features.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which.

DETAILED DESCRIPTION OF THE INVENTION

The invention will now be described based on preferred embodiments which do not intend to limit the scope of the present invention but exemplify the invention. All of the features and the combinations thereof described in the embodiment are not necessarily essential to the invention.

In the present specification, "state in which a member A is connected to a member B" includes a case where the member A and the member B are physically directly connected, and a case where the member A and the member B are indirectly connected by way of another member that does not influence the electrical connection state.

Similarly, "state in which a member C is arranged between a member A and a member B" includes a case where the member A and the member C, or the member B and the member C are directly connected, and also a case where the members are indirectly connected by way of another member that does not influence the electrical connection state.

Figure 1:
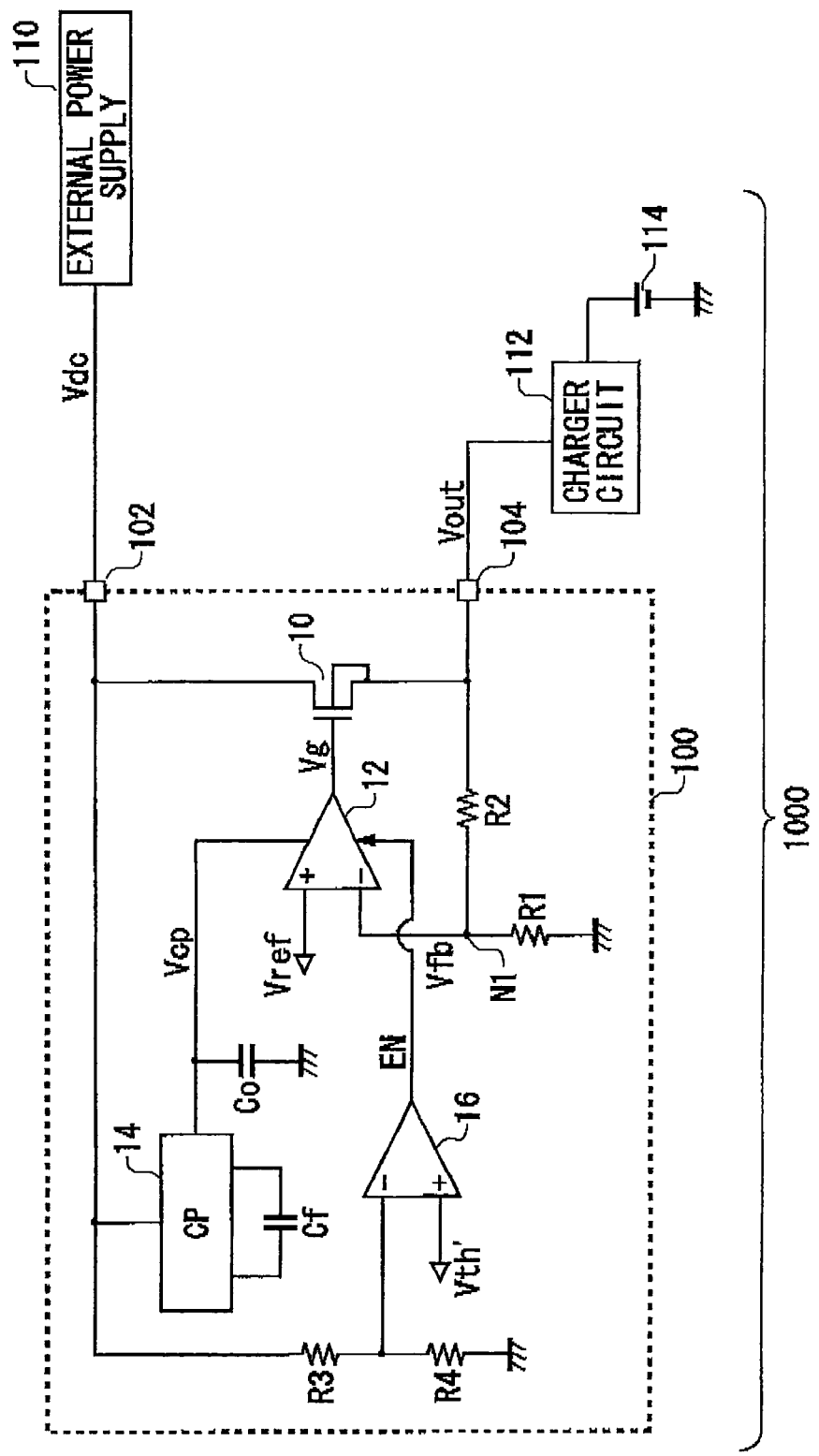
FIG. 1 is a circuit diagram showing a configuration of an overvoltage protection circuit according to an embodiment and an overall electronic equipment using the same.

FIG. 1 is a circuit diagram showing a configuration of an overvoltage protection circuit 100 according to an embodiment, and an overall electronic equipment 1000 using the same.

The electronic equipment 1000 is a cell-phone unit, or a battery-driven information terminal equipment such as PDA and laptop. The electronic equipment 1000 includes the overvoltage protection circuit 100, a charger circuit 112, and a battery 114. The electronic equipment 1000 also includes a digital circuit including a CPU (Central Processing Unit), a DSP (Digital Signal Processor), and a liquid crystal panel, which are not shown, and an analog circuit.

The battery 114 is a secondary battery such as lithium ion or NiCd (Nickel-Cadmium) battery, the battery voltage Vbat of which being supplied to other circuit blocks of the electronic equipment 1000.

An external power supply 110 is an emergency power supply that is connected to the electronic equipment 1000, and that uses an AC adapter which converts a commercial AC (Alternating current) voltage to a DC (Direct current) voltage, a DC/DC converter which drops the voltage of an in-vehicle battery and the like, a USB power supply, or a dry battery. The external power supply 110 supplies a DC power supply voltage Vdc to the battery 114.

The overvoltage protection circuit 100 includes an input terminal 102 and an output terminal 104, and is monolithically integrated on one semiconductor substrate. The DC voltage Vdc (hereinafter also referred to as input voltage Vdc) is applied from the external power supply 110 to the input terminal 102.

The overvoltage protection circuit 100 stabilizes the input voltage Vdc to a predetermined target voltage Vtgt and outputs the same, and completely turns OFF an output transistor 10 when the input voltage Vdc exceeds a threshold voltage Vth.

The overvoltage protection circuit 100 includes the output transistor 10, an error amplifier 12, a charge pump circuit 14, a controller 16, and a first resistor R1 to a fourth resistor R4.

The output transistor 10 is an N-channel MOSFET, and is arranged between the input terminal 102 and the output terminal 104.

The charge pump circuit 14 steps up the input voltage Vdc. The charge pump circuit 14 includes at least one flying capacitor Cf, and an output capacitor Co, as well as, a switch element (not shown). The step-up rate of the charge pump circuit 14 is arbitrary, but is preferably 1.5 times or 2 times. The charge pump circuit 14 is configured to have a high withstanding voltage since the input voltage Vdc is directly applied.

The first resistor R1 and the second resistor R2 are arranged in series between the output terminal 104 and a ground terminal, and voltage divide the output voltage Vout generated at the output terminal 104. A voltage generated at a node N1 of the first resistor R1 and the second resistor R2 is referred to as a feedback voltage Vfb. The error amplifier 12 receives a voltage Vcp stepped up by the charge pump circuit 14 as power supply. The error amplifier 12 outputs an error voltage of the feedback voltage Vfb corresponding to the output voltage Vout of the output terminal 104 and a predetermined reference voltage Vref to the gate of the output transistor 10. The error amplifier 12 is desirably configured using an operational amplifier of low power consumption type. With the error amplifier 12 as the low power consumption type, the electric current capacity of the charge pump circuit 14 can be designed to be small, and thus the capacitance values of the flying capacitor Cf and the output capacitor Co can be lowered and incorporation to an LSI (Large Scale Integration) becomes possible. In reality, it is difficult to incorporate even the output capacitor Co, but the merit of reducing the number of components by incorporating the flying capacitor Cf is large.

The controller 16 is a comparator and the like which compares an input voltage Vdc' voltage divided by the third resistor R3 and the fourth resistor R4 with a predetermined threshold voltage Vth', and forcibly turns OFF the output transistor 10 when the input voltage Vdc' is higher than the threshold voltage Vth'. That is, the output voltage Vout is shut down when the input voltage Vdc exceeds the threshold voltage Vth expressed as, $$Vth=Vth'\times(R3+R4)/R4.$$

The output of the controller 16 is output to the error amplifier 12 as an enable signal EN. The enable signal EN is high level when Vdc'<Vth', and low level when Vdc'>Vth'. The error amplifier 12 performs the normal error amplification when the enable signal EN is high level, and stops the operation when the enable signal EN is low level, and sets the output thereof, that is, the gate voltage Vg of the output transistor 10 to low level (ground voltage). The output transistor 10 is completely turned OFF when the gate voltage Vg of the output transistor 10 becomes low level. However, the method of turning OFF the output transistor 10 according to the enable signal EN is not particularly limited.

In other words, the output transistor 10 forms a linear regulator along with the first resistor R1, the second resistor R2, and the error amplifier 12, and functions as a switch which shields between the input terminal 102 and the output terminal 104.

The output voltage Vout is stabilized at the target voltage Vtgt expressed by, $$Vtgt=Vrefx(R1+R2)/R1$$

by the linear regulator. The target voltage Vtgt may be set according to the withstanding voltage of the charger circuit 112 and the rated power supply voltage. For instance, if the withstanding voltage of the charger circuit 112 is 5V, and the rated value of the power supply voltage Vdd is 3.5V, the target voltage Vtgt may be set in a range of 3.5V to 5V.

The threshold voltage Vth is set in view of the withstand voltage of the overvoltage protection circuit 100 and the drain-source withstanding voltage of the output transistor 10. Assuming the process withstanding voltage of the overvoltage protection circuit 100 is Vpt, and the source-drain withstanding voltage of the output transistor 10 is Vdst, the value of the threshold voltage Vth is designed to satisfy $$Vth<Vpt \qquad (1)$$

$$Vth-Vtgt<Vdst \qquad (2)$$

In the overvoltage protection circuit 100 of FIG. 1, a differential voltage of the DC voltage Vdc and the target voltage Vtgt is applied to drain-source since the voltage of the output terminal 104, that is, the source voltage of the output transistor 10 is fixed at the target voltage Vtgt. Therefore, the voltage exceeding the withstanding voltage is prevented from being applied to the output transistor 10 by setting the threshold voltage Vth so as to satisfy equation (2).

Figure 2:
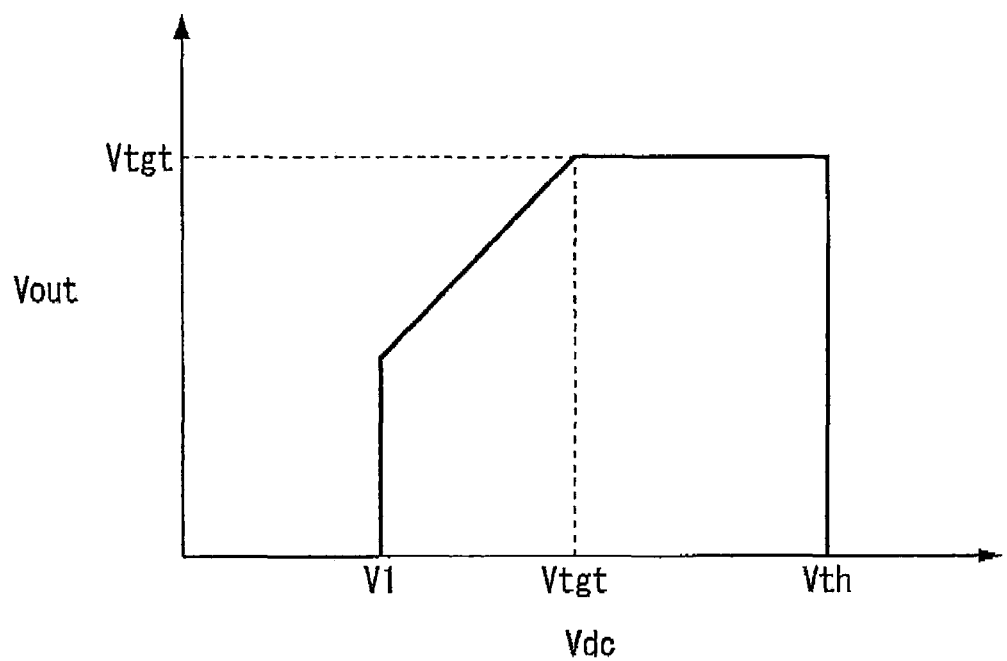
FIG. 2 is a view showing input/output characteristics of the overvoltage protection circuit of FIG. 1.

FIG. 2 is a view showing input/output characteristics of the overvoltage protection circuit 100 of FIG. 1. In a state where the input voltage Vdc is lower than a voltage level V1, the charge pump circuit 14 does not function and the error amplifier 12 also does not function, and thus the output transistor 10 is not turned ON and the output voltage Vout becomes 0V.

When the input voltage Vdc exceeds the voltage level V1, and the charge pump circuit 14 and the error amplifier 12 start to operate, the output transistor 10 operates in a state close to the fully turned ON state, and the relationship of Vdc≈Vout is maintained.

When the input voltage Vdc exceeds the target voltage Vtgt, the output voltage Vout is stabilized at the target voltage Vtgt, and supplied to the charger circuit 112 or the load. When the input voltage Vdc exceeds the threshold voltage Vtg, the output transistor 10 is turned OFF, and the overvoltage protection circuit 100 itself is protected.

The overvoltage protection circuit 100 of FIG. 1 has the following advantages.

1. The gate voltage Vg of the output transistor 10 is the input voltage Vdc at maximum if the charge pump circuit 14 is not used. Therefore, the output voltage Vout is Vdc−Vt at maximum, and the value greater than or equal thereto cannot be output. Here, Vt is the gate-source threshold voltage of the output transistor 10.

Since the input voltage Vdc is stepped up by using the charge pump circuit 14, and the gate voltage Vg of the output transistor 10 is adjusted using the stepped-up voltage, the output transistor 10 can be fully turned ON, and the output voltage Vout close to the input voltage Vdc can be generated.

2. An advantage in that the output voltage Vout can be clamped to smaller than or equal to the gate voltage Vg is obtained by using a source follower type regulator. This effect is apparent by comparing with a regulator using a P-channel. When the P-channel MOSFET is used, the input voltage Vdc rapidly rises since the input voltage Vdc becomes the source voltage, where the gate-source voltage Vgs becomes large if the feedback to the gate voltage Vg is delayed, and the output transistor 10 is fully turned ON. Consequently, the input voltage Vdc of overvoltage is output as is as the output voltage Vout.

The feedback to the gate voltage Vg is delayed when the input voltage Vdc rapidly rises beyond the feedback speed of the regulator. In this case as well, the source voltage (output voltage Vout) of the output transistor 10 becomes Vg−Vt, and thus can be prevented from rising following the input voltage Vdc.

3. In manufacturing the MOSFET using the process in which the gate-source withstanding voltage is low, when the P-channel MOSFET is used, the gate-source voltage becomes an overvoltage if the input voltage Vdc becomes an overvoltage, which may influence the reliability. When the N-channel MOSFET is used, on the other hand, the gate-source voltage barely changes even if the input voltage Vdc becomes an overvoltage, which is advantageous from the standpoint of reliability.

4. The following advantages are obtained by monolithically integrating the overvoltage protection circuit 100 and configuring with one chip.

Design is made in view of both the current capacity of the charge pump circuit 14 (driving ability of the load) and the current consumption of the error amplifier 12. If the charge pump circuit and the error amplifier 12 are individually designed as separate chips, it is difficult to optimize the current capacity of the charge pump circuit to the error amplifier 12, and thus the charge pump circuit 14 side becomes over-engineered, the area of the switch element becomes large, and the flying capacitor Cf and the output capacitor Co need to be externally attached. If configured with one chip as in the present embodiment, the charge pump circuit 14 can be designed as small as possible, and thus the area of the switch element can be reduced, and the possibility of integrating at least one or both of the flying capacitor Cf and the output capacitor Co becomes high.

5. If the quality of the external power supply such as adapter is bad, surge voltage may occur at the output of the external power supply. In the case of the overvoltage protection circuit including the switch element which is turned OFF when the input voltage exceeds the threshold value, the charging operation may not be correctly performed since the switch element is turned OFF when the surge is input. According to the overvoltage protection circuit of a regulator type according to the embodiment, on the other hand, the surge can be responded by setting the threshold voltage Vth high.

The above embodiment is illustrative, and it should be recognized by those skilled in the art that various variants can be contrived for the combination of each component and each processing process, and that such variants are also encompassed within the scope of the present invention.

The case where the overvoltage protection circuit 100 and the charger circuit 112 are configured as separate ICs has been described in the embodiment, but such circuits may be integrated and configured as a power supply management IC. Alternatively, the overvoltage protection circuit 100 may be configured as a discrete element.

In the present embodiment, the setting of logical values of high level and low level is an example, and can be freely changed by appropriately inverting with an inverter and the like.

While the preferred embodiments of the present invention have been described using specific terms, such description is for illustrative purposes only, and it is to be understood that changes and variations may be made without departing from the spirit or scope of the appended claims.

What is claimed is:

1. An overvoltage protection circuit comprising:
an input terminal externally input with an input voltage;
an output terminal;
an output transistor of N-channel MOSFET (Metal Oxide Semiconductor Field Effect Transistor) arranged between the input terminal and the output terminal;
a charge pump circuit which steps up the input voltage;
a controller configured to compare the input voltage with a predetermined threshold voltage, and to output an enable signal having a first level when the input voltage is lower than the predetermined threshold voltage;
an error amplifier configured to receive a voltage stepped up by the charge pump circuit as a power supply, to receive a feedback voltage corresponding to a voltage of the output terminal at an inverting input terminal thereof, to receive a predetermined reference voltage at a non-inverting input terminal thereof, and to receive the enable signal at an enable terminal thereof, an output terminal thereof being connected to a gate of the output transistor,
wherein the output transistor and the error amplifier form a linear regulator, and wherein
the error amplifier is configured to (i) perform a normal error amplification when the enable signal has the first level, and to (ii) stop the amplification and to set the output thereof to a low level so as to forcibly turn off the output transistor when the enable signal has a second level.

2. The overvoltage protection circuit according to claim 1, being monolithically integrated on one semiconductor substrate.

* * * * *